(12) United States Patent
McCoubrey

(10) Patent No.: US 8,523,256 B2
(45) Date of Patent: Sep. 3, 2013

(54) MULTI FUNCTIONAL TRANSPORTABLE FIELD MAINTENANCE AND REPAIR ASSEMBLY

(76) Inventor: Neil McCoubrey, Willoughby (AU)

( * ) Notice: Subject to any disclaimer, the term of this patent is extended or adjusted under 35 U.S.C. 154(b) by 69 days.

(21) Appl. No.: 13/144,618

(22) PCT Filed: Jan. 16, 2010

(86) PCT No.: PCT/AU2010/000034
§ 371 (c)(1), (2), (4) Date: Sep. 12, 2011

(87) PCT Pub. No.: WO2010/081196
PCT Pub. Date: Jul. 22, 2010

(65) Prior Publication Data
US 2011/0316299 A1    Dec. 29, 2011

(30) Foreign Application Priority Data
Jan. 16, 2009    (AU) ............................. 2009900179

(51) Int. Cl.
*B60P 3/14*    (2006.01)
*B64F 5/00*    (2006.01)

(52) U.S. Cl.
USPC .................................................. 296/24.32

(58) Field of Classification Search
USPC ...................................................... 296/24.32
See application file for complete search history.

(56) References Cited

U.S. PATENT DOCUMENTS

| | | | | |
|---|---|---|---|---|
| 2,719,748 A | * | 10/1955 | Tilley | 296/24.32 |
| 2,811,111 A | * | 10/1957 | Levitz et al. | 104/126 |
| 3,570,503 A | * | 3/1971 | DeBoliac | 134/58 R |
| 4,016,994 A | * | 4/1977 | Wurster | 406/39 |
| 4,055,206 A | * | 10/1977 | Griffin | 144/285 |
| 4,133,572 A | | 1/1979 | Robbins et al. | |
| 4,166,874 A | * | 9/1979 | McCready | 428/36.1 |
| 4,171,114 A | * | 10/1979 | Marden | 244/116 |
| 4,688,308 A | * | 8/1987 | Alvarez | 29/33 R |
| 4,820,564 A | * | 4/1989 | Cologna et al. | 428/63 |
| 4,874,445 A | | 10/1989 | Lavoie | |
| 5,168,709 A | * | 12/1992 | Bombard | 62/48.1 |

(Continued)

FOREIGN PATENT DOCUMENTS

EP    1997679    12/2008

OTHER PUBLICATIONS

"Prepositioned Trailers for Aircraft Battle Damage Repair Support Thesis" Scott M. Murray, Captain, USAF, AFIT/GLM/ENS/04-13, Department of the Air Force Air University Air Force Institute of Technology, Wright-Patterson Air Force Base, Ohio pp. 23-24, 87-106 Figs 2, 3, Mar. 2004.

*Primary Examiner* — Glenn Dayoan
*Assistant Examiner* — Paul Chenevert
(74) *Attorney, Agent, or Firm* — Shalom Wertsberger; Saltamar Innovations

(57) ABSTRACT

A self contained mobile assembly capable of use for remote area maintenance and repair of unwanted damage to a wall of a confined space tanks. The assembly comprises an undercarriage carriage including a wheel base, a housing mounted above the wheel base and defining an internal space capable of receiving and retaining repair and maintenance equipment for repairing said tank. The equipment includes a defouling kit, equipment for desealing and resealing of an interior of the confined space tank, equipment for decontamination of air in the tank; and a breathing kit for a wearer to safely access the internal space and repair the unwanted damage from the inside of the confined space.

15 Claims, 4 Drawing Sheets

(56) References Cited

U.S. PATENT DOCUMENTS

| | | |
|---|---|---|
| 6,860,300 B1 * | 3/2005 | Kuntz .......................... 141/65 |
| 7,114,754 B2 * | 10/2006 | Morello .................... 296/24.32 |
| 7,793,398 B2 * | 9/2010 | Dumortier et al. ......... 29/402.01 |
| 7,900,333 B2 * | 3/2011 | Tweet et al. ..................... 29/428 |
| 2002/0153747 A1 | 10/2002 | Ropp |
| 2010/0301624 A1 * | 12/2010 | Boos et al. ................. 296/24.32 |

* cited by examiner

PLAN VIEW – ROOF REMOVED

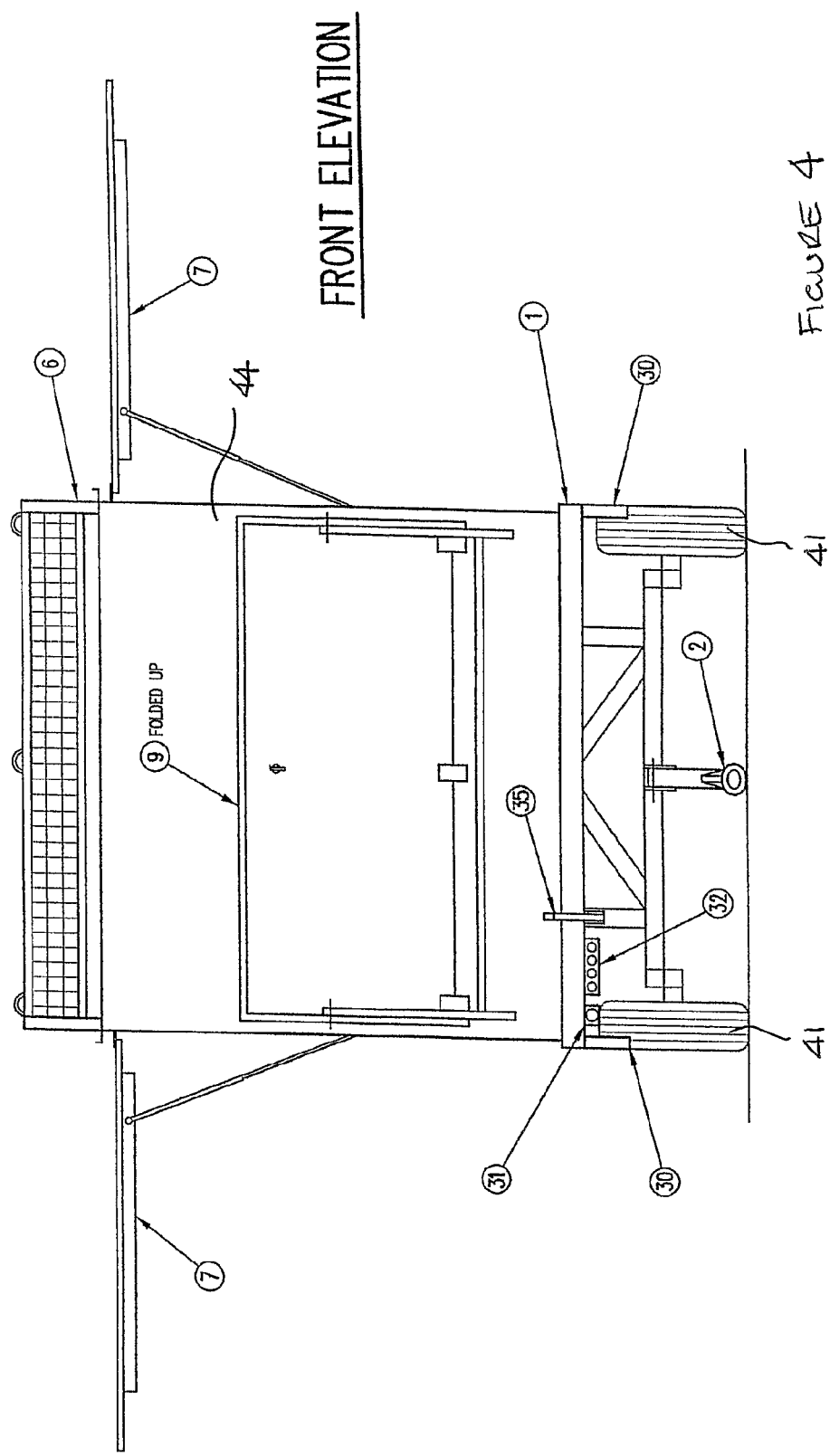

MULTI FUNCTIONAL TRANSPORTABLE FIELD MAINTENANCE AND REPAIR ASSEMBLY

BACKGROUND

The present invention relate to ground support equipment for aircraft fuel systems including for inspection and maintenance operations, fuel tank ventilation and supplied air respiratory protection.

More particularly the present invention relates to a self contained mobile trailer assembly with constructional characteristics which make it suitable for transportation and deployment in remote areas such as in military theatres of war and allow activities to be performed using the assembly station such as the repair of fuel tanks in aeroplanes when damaged by such events as bullet strikes and impact loading causing punctures in the tank. The assembly according to the invention is convenient to deploy and is particularly advantageous in remote areas.

The present invention also relates to a mobile trailer unit which is capable of loading onto transport vehicles such as road vehicles, aircraft and the like enabling trades persons to perform remote field activities and repairs with all equipment necessary to meet those objectives. The present invention is particularly advantageous where no industrial repair and/or maintenance facilities otherwise exist particularly in remote areas and battlefields and where aircraft are damaged by ground to air fire.

PRIOR ART

It is a well known fact that aircraft fuel tanks and for that matter other parts of an aircraft, when ruptured ballistically or by impact, are very difficult to repair. Many materials and methods have been tried, but without success. The variety of materials such as metal, plastics and nylon, which must be bonded to make a satisfactory repair renders the repair problem particularly challenging. A combination of bonding matrixes has been found which has resulted in a desirable fuel cell repair system.

The problem of repairing crashworthy fuel cells was disclosed in U.S. Pat. No. 4,166,874 entitled *Fuel Cell Ballistic Repair and Fitting Replacement*. A solution was use of a combination of matrixes with selected curing agents. To maintain the crashworthy, self-sealing character of rubber-impregnated nylon fuel cells which require fittings, or which have been ballistically damaged or torn on impact, a composition for the repair of such ruptures was developed which included two curing matrixes. The composition for sealing, coating and bonding a nylon patch or fitting to a nylon-reinforced acrylonitrile-butadiene aircraft crashworthy fuel tank comprised a combination of two curing matrixes. The first matrix, when separated, contained the curing agent for the second matrix. The second matrix, contained the curing agent for the first.

One of the difficulties experienced in a theatre of war is puncture damage to aircraft fuel tanks and the consequent problem of repair of such damage. Puncture damage may occur as a result of ordinance penetration such as by bullets. Bullet penetration results in at least one relatively small hole usually commensurate with the size and type of bullet. A bullet which penetrates an aircraft fuel tank can cause an entry opening and an exit opening both of which require repair if the tank is to be restored for reuse. Alternatively in the most serious case, a bullet may penetrate through one opening and generate a shock wave inside the fuel tank as fuel impacts on an opposite side to that which the tank was initially struck resulting in a wing separation and catastrophe. In that case, repair is not an option. To address that serious danger and to dissipate the shock wave to preserve the wing, manufacturers have introduced energy dissipaters which are a layer of Kevlar placed about the inside of the tanks.

Openings and cracks and tiny holes can also develop in aeroplane skins as they age. Mechanics normally identify these problems during regular maintenance checks, but a technique has been developed which mimics natural healing. Researchers at the Engineering and Sciences Research Council have developed a composite material that "bleeds" resin when stressed or damaged, effectively creating a "scab" that fixes the damage. The composite material is made from hollow fibers filled with epoxy resin. When a hole or crack appears, in an aeroplane wing for instance, the resin leaks out and seals the break and returns it to 80 to 90 percent of its original strength. The epoxy is coloured, making it easy for mechanics to spot the repairs and make a permanent fix. This approach can deal with small-scale damage that's not obvious to the naked eye but which might lead to serious failures in structural integrity if it escapes attention.

In a case where bullet damage is such that a plane can land for repair, fuel tanks and any damaged associated fuel systems can be repaired. Usually in remote regions such as war zones, the facilities and equipment to repair such damage is not readily available, especially taking into account the specialised nature of the work involved in making good a damaged tank so the plane can be returned to active service.

Traditional known facilities and equipment used for repair of damaged aircraft and particularly fuel tank ruptures are not readily adaptable for use in remote locations and specifically theatres of war. Typically when a ruptured tank requires repair, maintenance and repair services including equipment and personnel must be brought to the locality of the aircraft. This is expensive, time consuming and leads to increased down time. In a typical repair of an aircraft tank which has been penetrated ballistically a first step is to drain the tank before gaining access to the internal space of the tank. Aircraft wing tanks are considered a confined entry space to which special safety rules apply. Personnel who enter confined space tanks have special training to cope with the difficult and dangerous working conditions.

Also, due to the random and unexpected nature of the events which necessitate the above repairs it is not easy to predict where facilities will be required in each instance. The problem of remoteness is also a challenge if a damaged aircraft is not airworthy to fly to a repair location. Such is the diversity of the equipment required in repair of a ballistically damaged aircraft tanks, bringing repair equipment to the field can necessitate obtaining equipment from a variety of sources. This is inconvenient and adds to the cost and danger of deployment.

In addition, in order to effectively cover the vast range of emergency repairs required to aircraft tanks damaged as a result of war, accident, etc., there is a long felt want to provide a solution to the aforesaid problems of lack of convenient availability of repair facilities and more particularly lack of instant response high level field repair services.

There are a wide variety of repair applications which demand field response and which might otherwise be conducted in a permanent location. There are also a wide number of repair activities which can only be performed in the field such as emergency repairs in war zones, natural disasters and the like.

INVENTION

This present invention provides a mobile self-contained trailer assembly for use in field applications such as for military purposes. The present invention also provides equipment in kit form which makes it suitable for convenient transportation and deployment in remote areas such as in military theatres of war, allowing activities to be performed using the assembly station such as repair of fuel tanks in aeroplanes when damaged by such events as bullet strikes, impact loading causing punctures in the tank.

The present invention provides a mobile trailer which is capable of loading onto transport vehicles such as road vehicles, aircraft and the like enabling trades persons to perform remote filed activities, repairs with all equipment necessary to meet those objectives. The assembly according to the invention is convenient to deploy and particularly an advantage in remote areas.

Ventilating, inspecting and repairing aircraft fuel tanks is a necessary but hazardous job, requiring a variety of safety precautions. Closed fuel tanks by nature are confined spaces that are filled with toxic chemicals and no fresh air. The present invention provides an efficient field deployable mobile air venting system The portable system can ventilate one or multiple aircraft tanks at once, and it can be used on any aircraft from helicopters to large military transports.

Although the invention will be predominantly described with reference to its application in field repairs of aircraft damaged by ground to air artillery and particularly in repair of fuel tanks damaged by gunfire, to supplement existing facilities or in remote locations such as in war zones, it will be recognised by persons skilled in the art that the invention has a wide variety of field applications beyond those to be described by way of example. The present invention is particularly advantageous where no industrial repair and/or maintenance facilities otherwise exist particularly in battlefields and where aircraft are damaged by ground to air gunfire.

In its broadest form the present invention comprises:

a self contained mobile assembly capable of use in the repair of unwanted penetrations in a wall of a confined space accessible from the inside by a person; the assembly comprising a carriage having a wheel base, a housing mounted on the wheel base and defining an internal space capable of receiving and retaining repair and maintenance equipment including; a de fouling kit, means to enable de sealing and resealing of an interior of the confined space, and a breathing kit for a wearer to safely access the confined space and repair the unwanted penetration from the inside of said confined space.

In another broad form of a method aspect the present invention comprises;

a method of repair of unwanted penetrations in a wall of a confined space accessible from the inside by a person: the method comprising the steps of;

a) taking a self contained mobile assembly capable of use in the repair; the assembly comprising a carriage having a wheel base, a housing mounted on the wheel base and defining an internal space capable of receiving and retaining repair and maintenance equipment;

b) emptying a tank of any liquid stored therein;

b) taking a de fouling kit from said housing; spraying de fouling reagent on an inner surface of the tank to be de fouled;

c) de sealing the tank using a de sealing and resealing kit capable of de sealing and/or resealing of an interior of the confined space, d) manually repairing said unwanted penetration/s.

According to a preferred embodiment the assembly comprises a wheel mounted trailer including compartments which receive and retain therein at least a de fouling kit, a sealing and de sealing kit, breathing apparatus, and a ventilation apparatus. According to a preferred embodiment, the trailer comprises a frame, side walls and end walls defining the housing and a base mounted on said wheel base.

Preferably, each portable repair assembly is constituted by the necessary safety and maintenance equipment and fittings for performing a wide variety of repair procedures and particularly though not exclusively repair of aircraft fuel tanks ballistically damaged.

The present invention is particularly advantageous where no maintenance and repair facilities exist in remote locations as the self contained assembly can be easily transported to site via land,sea or air.

The housing comprises a mainframe having connected thereto at least one movable panel which is capable of movement between a first state in which the at least one panel encloses said at least one internal space or compartment of the assembly and a second state in which said at least one panel is removed or opened to allow access to said at least one internal space or compartment and equipment in that space.

The assembly is arranged as a trailer for towing behind a vehicle, self propulsion or loading onto a transport craft such as a heavy vehicle or aircraft.

In another broad form the present invention comprises:

a self contained mobile repair and maintenance assembly including a wheel mounted housing defining an internal space for receiving and retaining therein a de fouling kit, breathing apparatus, a sealing and resealing kit, wherein the assembly is capable of transportation to remote locations; wherein the assembly is deployable to remote locations for the repair and sealing of aircraft wing tanks.

In a further broad form the present invention comprises:

a transportable modular field repair assembly for the repair of punctured fuel tanks on military aircraft the assembly comprising;

a service trailer including an undercarriage, walls, a roof and a base together defining an internal space, at least one said walls having access means to the internal space; the undercarriage allowing transportation of said service trailer;

the module capable of receiving and retaining in said internal space at least one portable unit, selected from an anti fouling kit, ventilation kit, sealing kit and breathing apparatus.

In a further broad form the present invention comprises:

a mobile trailer unit capable of use in the field repair and maintenance of damaged aircraft fuel tanks; the trailer unit formed from a module having walls defining an internal space capable of receiving and retaining therein various technical equipment to facilitate and enable field repair of a penetrated petrol tank;

an undercarriage having a wheel assembly and capable of receiving and retaining thereon said unit, the trailer including means to allow the unit to move between a folded non working state and a deployed working state in which the unit provides equipment for repair of a fuel tanks.

According to one embodiment, the mobile trailer unit is defined by a housing comprising a mainframe having connected thereto movable panels which enclose at least one internal space or compartment and a second state in which said panels are removed to allow access to the internal space or compartment; the trailer unit further including subassemblies associated with the repair of damaged fuel tanks.

Preferably the assembly of the present invention is a confined space entry trailer particularly adaptable in the repair of punctured fuel tanks in Hercules C130 aircraft.

In a broad form of a method aspect, the present invention comprises:

a method for the maintenance or repairing at a remote location, unwanted penetrations in a wall of a confined space aircraft fuel tank of the type whose inside confined space is accessible to a person for said repair from the inside, the method comprising the steps of;

a) deployment of a mobile self contained assembly capable of use for the repair of the damaged fuel tank on said aircraft; the assembly comprising an undercarriage having a wheel base, a housing mounted on the wheel base and defining an internal space capable of receiving and retaining repair and maintenance equipment;

b) emptying a confined space tank to be repaired of any liquid stored therein;

c) evacuating contaminated air, fumes or vapours from the tank;

d) taking a de fouling kit from the assembly and spraying de fouling reagent on an inner surface of the tank to be de fouled;

e) de sealing the tank using a de sealing and resealing kit capable of de sealing;

f) manually repairing unwanted penetration/s in the tank.

g) resealing the interior surface of the confined space tank.

The present invention provides an alternative to the known prior art and the shortcomings identified. The foregoing and other objects and advantages will appear from the description to follow. In the description reference is made to the accompanying representations, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying illustrations, like reference characters designate the same or similar parts throughout the several views. The following detailed description is, therefore, not to be taken in a limiting sense, and the scope of the present invention is best defined by the appended claims.

BRIEF SUMMARY OF DRAWINGS

FIG. 4 shows according to a preferred embodiment an end (front) elevation view of the mobile repair and maintenance assembly of FIG. 1;

DETAILED DESCRIPTION

Although the present invention will be described with reference to its application in remote field applications in the repair of punctured aircraft tanks, it will be appreciated by persons skilled in the art that the assembly to be described below is suitable for remote operations such as but not limited to ballistic injury to an aircraft.

The embodiment to be described below is one example of an assembly which provides convenient repair and maintenance of an aircraft fuel tanks.

Figure 1:
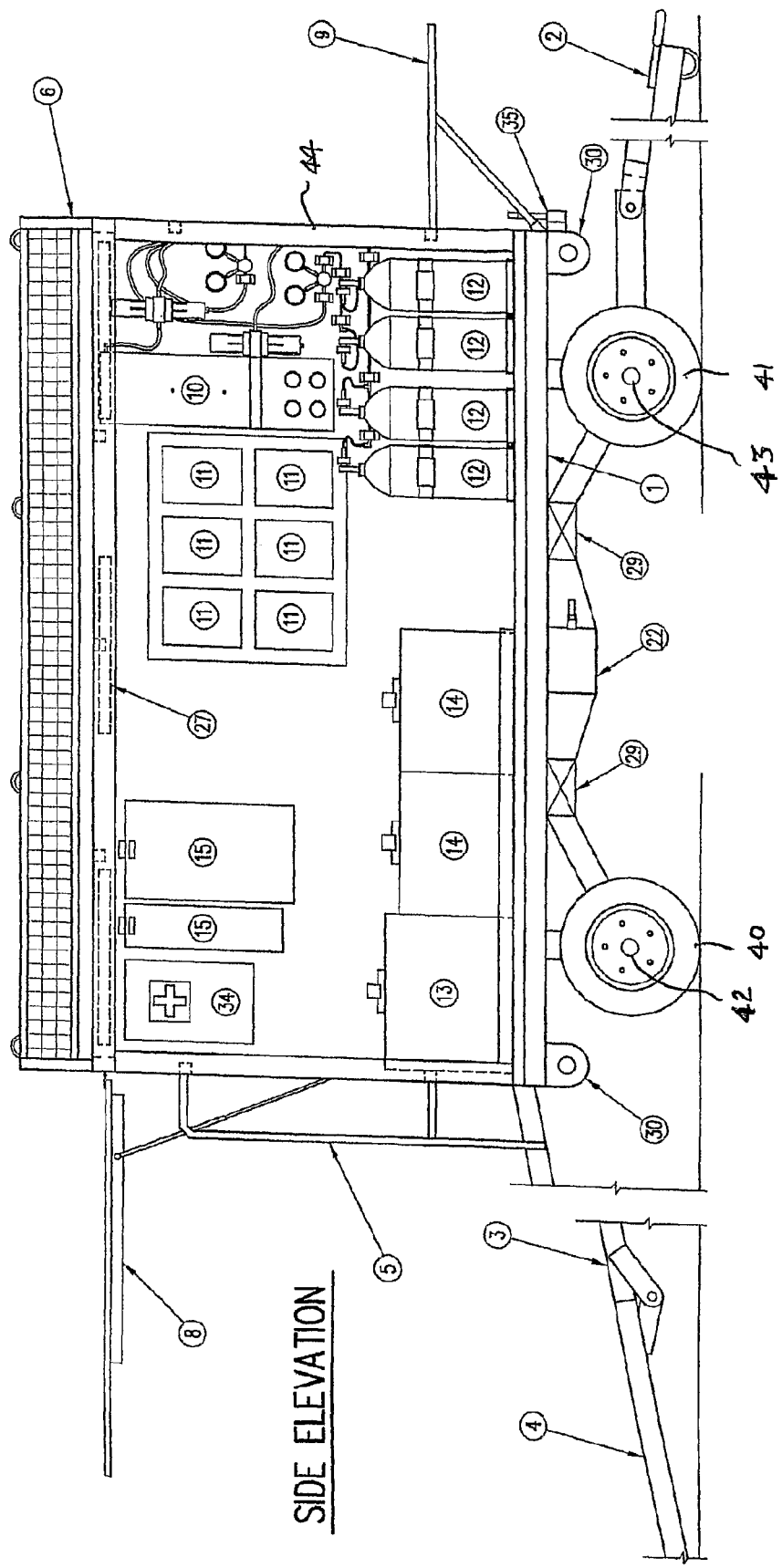
FIG. 1 shows a side elevation view of a mobile transportable repair and maintenance assembly according to a preferred embodiment.

FIG. 1 shows a side elevation view of a mobile transportable repair and maintenance assembly according to a preferred embodiment. The assembly comprises trailer chassis 1 supported by wheels 40 and 41 mounted on axles 42 and 43 respectively. Connected to axle 43 is a tow hitch assembly 2 which enables the assembly to be towed by a vehicle for transportation purposes. At its opposite end, chassis 1 has associated with it a ramp assembly comprising a folding ramp top 3 and folding ramp bottom 4 which moves between a folded non working configuration and an unfolded working configuration to allow access to the interior of the assembly and to allow equipment to be easily removed from and stowed therein. The assembly further comprises access ladder 5 and roof rack 6 for transit storage of articles. Side access panels 7 (see FIG. 4) and rear access panel 8 enable access to compartments and equipment stored in the assembly. When the assembly is deployed, it may be set up for access to all on board facilities and equipment. Folding work bench 9 is mounted externally from wall 44 to provide a work surface or platform to support equipment under deploy. The assembly also comprises a breathing and air system 10 including a plurality of respirator masks 11 and a plurality of cylinder breathing 200 bar air tanks 1. Further equipment includes a communications kit 13, gas monitors 14, hanging anti static mats 15. 2. Chassis 1 also includes a pair of 29 fork lift sleeves to enable lifting by a fork lift vehicle. A storage compartment 22 is included on chassis 1 along with tie down cleats 30. The trailer assembly is also equipped with a hand brake 35 which provides selective braking of the trailer when parked. Other facilities provided include fluorescent lights 27 which light the internal space within the trailer.

Figure 2:
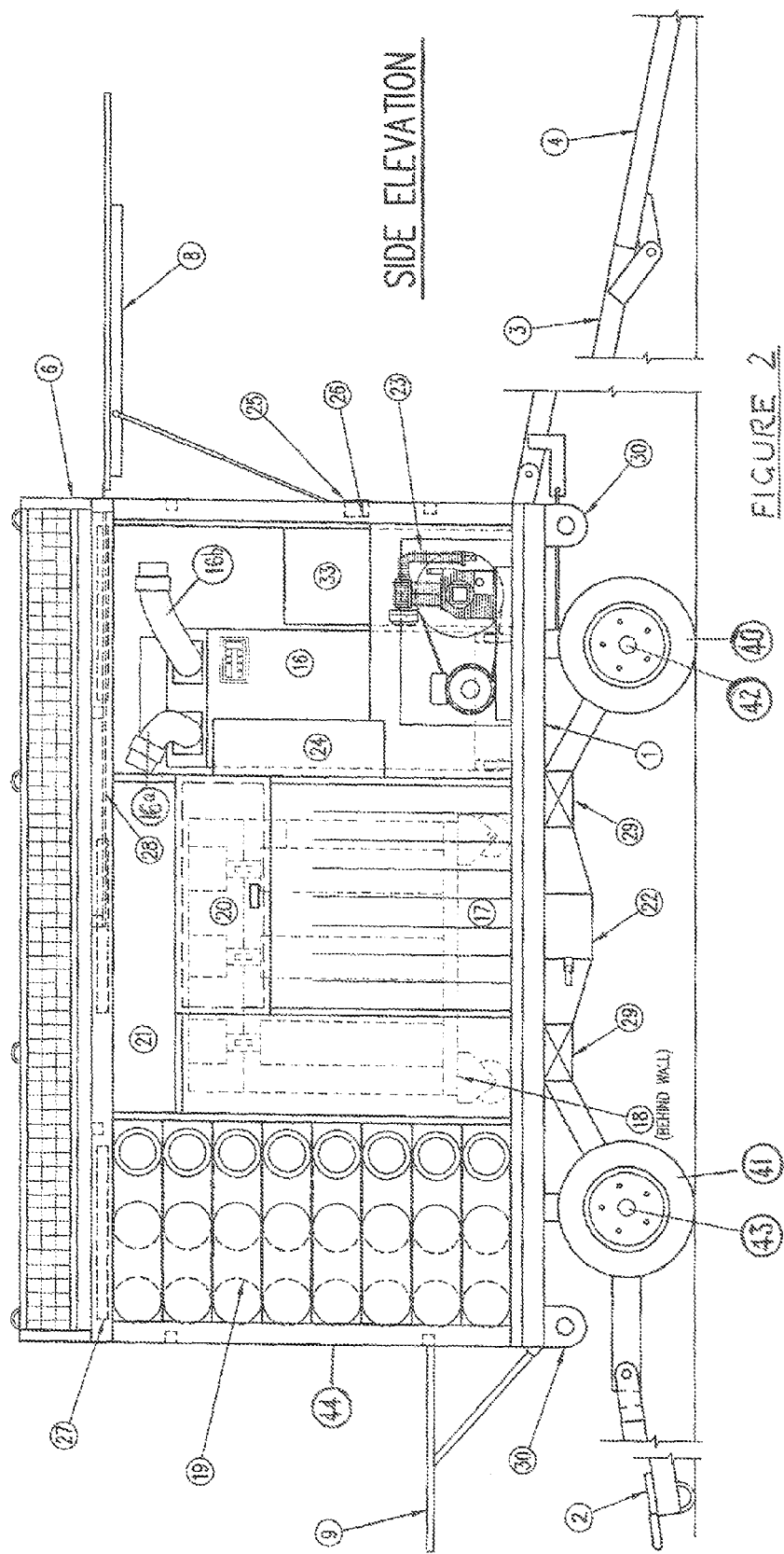
FIG. 2 shows an opposite side elevation view according to a preferred embodiment of the mobile repair and maintenance assembly of FIG. 1.

FIG. 2 shows with corresponding numbering for corresponding parts an opposite side elevation view according to a preferred embodiment of the mobile repair and maintenance assembly of FIG. 1 with corresponding numbering for corresponding parts. The trailer is equipped with a portable air cooler 16 and also includes compressor/air purifier unit 23, air receiver 24, tanks mat holders 17 and external power inlet 25. Compressor/Air Purifier unit 23 is preferably a mobile deployable unit that can be used to supply breathing air during fuel tank entry requirements.

The breathing air purifier is pneumatically operated and suitable for the most hazardous areas. The purifiers remove common contaminants, such as oil, water, odour, sulphur dioxide, nitrogen oxides, carbon dioxide and carbon monoxide to levels below the limits set by prescribed standards.

The confined space entry breathing air systems are to provide high quality breathable air from a compressed air supply for use with a Compressed Air Supply or as a stand by backup. No external electrical supply is necessary as the assembly is self-sufficient.

An air supply connected to the mobile compressor passes through an after cooler for cooling the breathing air. The air purifier is designed to remove common contaminants, oil, water, odour, sulphur dioxide, nitrogen oxides, carbon dioxide and carbon monoxide to levels below the limits set by the appropriate standard.

Air cooler unit 16 is portable and intended to be used as a 'spot' cooler to lower temperatures in aircraft fuel tanks and other confined spaces and to aid in the circulation of the air. Cooling these areas increases the comfort levels whilst working in these areas and increases productivity and efficiency. The unit is not intended for use on the flight line or at away bases and equipment should be operated 50 ft/15 m away from aircraft outside the safety zone when there is a hazardous area present. Typically the air cooler 16 is a 240V AC supplied unit which can also be powered from portable generators if required. A cooling capacity of 16,900 BTU/h (4,250 kcal/h is sufficient for its intended use. Unit 16 can also be provided for operation in fan mode to provide circulating air only and can be fitted with wheels and steered easily into position. Two rear wheels are lockable. Two flexible air outlets 16a and 16b are installed for distribution of air from cooling unit 16 unit. The outlets can also be modified and fitted with J-Slot adaptors or flexible anti static hoses. A condensate tank (not shown) is provided in the rear of the unit for collecting water. The tank is easily removed and drained by users when required. A warning will appear on display when the tank requires emptying. The unit will shut down if the tank approaches full. Other features of the cooling unit include an evaporator filter for filtering input air, a digital control panel that is easy to use, A timer for automatic interval and shutdown programming and error signal alerts.

A light switch 26 is provided to power fluorescent lights 27 (see FIG. 1). A hanging cloth rail 28 is provided as an internal accessory in addition to external features of fork lift sleeves 29 and tie down cleats 30. Associated with the air delivery system there is provided a primary air feed 31 and breathing air manifold 32. A generator 33 is provided for on site power requirements. A first aid kit 34 is also provided as an accessory. Trailer chassis 1 is secured by handbrake 35.

Figure 3:
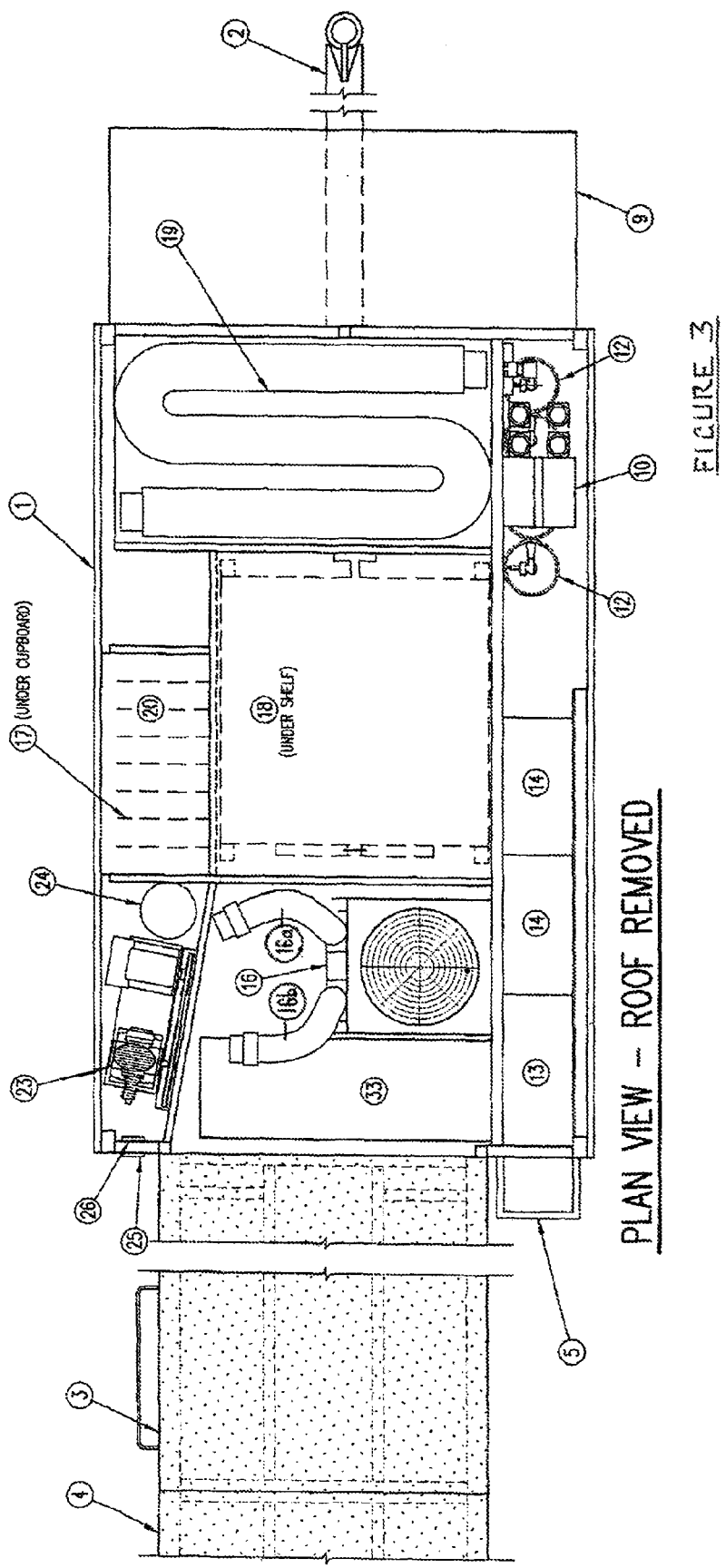
FIG. 3 shows according to a preferred embodiment a top view of a mobile transportable repair and maintenance assembly of FIG. 1.

FIG. 3 shows according to a preferred embodiment a top view of a mobile transportable repair and maintenance assembly of FIG. 1 with corresponding numbering for corresponding parts described earlier. Air vent kit 18 is mounted near the roof of the assembly along with insulated ducting 19, storage cupboard 20, storage shelf 21 and storage compartment 22 (see FIG. 1).

FIGS. 1-3 show the assembly in its fully packed state for transportation either as a trailer attached to a transport vehicle or for loading onto a larger transport vehicle such as a plane, truck or ship for transport to remote locations. Chassis 1 of trailer base preferably has robust construction to accommodate loadings induced by equipment held within the housing.

FIG. 4 shows with corresponding numbering and according to a preferred embodiment an end (front) elevation view of the mobile repair and maintenance assembly of FIG. 1.

The arrangement shown in FIGS. 1-4 contemplates according to one embodiment, the use of a primary housing mounted on a carriage for transportation and which includes an internal space which is capable of receiving and retaining therein a plurality of apparatuses and equipment which may be separated from the housing to form a work station. It will be seen that the trailer assembly can be transported by towing and the proportions adjusted to facilitate particular types of transportation by land, sea or air.

Although a trailer carriage is a convenient means of transportation of the maintenance and repair assembly, this is not to be construed as limiting of the adaption of the assembly to alternative forms of transportation not requiring an undercarriage.

The trailer assembly may be fully equipped as a mobile maintenance station which is closed for transportation and may be opened for deploy of equipment for performing a wide variety of procedures and particularly though not exclusively repair of punctured confined space fuel tanks. Transportation of the trailer assembly includes hitching to road vehicles such as cars and trucks, loading onto aircraft, and the like enabling personnel to perform repairs on the ground in potentially remote locations, and if necessary, during air transit. The present invention is particularly advantageous where no maintenance facilities are not readily available as in areas of war.

The embodiment previously described is one example only and it will be appreciated by persons skilled in the art that the configuration may be adjusted to accommodate size, weight and portability constraints such as its own transportation in land, sea and air vehicles. The present invention obviates the disadvantages of the prior art and provides other advantages which are apparent from the description herein.

For installation in a standard transport vehicle, aircraft or the like it is constituted by an integrated assembly of equipment and fittings, so enabling it to be conveniently loaded or unloaded at its place of destination. Dimensions are defined according to the particular application or applications and according to the activities carried out. Ideally the trailer will have length greater than width but of sufficient width and length to accommodate average sized equipment modules as described above. In certain cases the dimensions may be adjusted to accommodate prescribed applications as well as fitting into a transport vehicle so the assembly may be moved conveniently from location to location.

Typically a module might have a length in the order of 3-4 m, width in the order of 2 m, height in the order of 2 mm in a closed configuration. These dimensions are non limiting but have been found to be a practical size. According to one embodiment, a generator may be mounted on the trailer carriage for use as its remote power supply. The unit housing preferably comprises a mainframe having connected thereto at least one movable panel which is capable of movement between a first state in which the at least one panel encloses the at least one internal space or compartment and a second state in which the at least one panel allows access to the at least one internal space or compartment.

Typically, when a confined area tank has been damaged/penetrated such as by a projectile, the tank is initially ventilated to remove any residual fumes. The tank is also de sealed and de fouled using de fouling gear so that after these actions the tank becomes a safe environment for confined space personnel to commence access for repairs. Draining and defouling of tanks takes place before personnel are required to enter the tank for repairs. The assembly includes equipment for evacuating/draining tanks in a totally sealed environment. This has numerous advantages including prevention of human contact with fuel, eliminates fuel spills, enables each job to be conducted in reduced time. The draining equipment also attaches to a variety of aircraft, reduces personnel requirements. It also prevents overfilling with automatic fail-safe shutoff system, drains up to four aircraft fuel cells simultaneously and has low operating costs. Preferred compressed air requirements are typically 60 CFM at 100 PSIG or 30 L/sec at 700 kPa. In the case where a venting kit is used total air consumption becomes 120 CFM at 100 PSIG or 60 L/sec at 700 kPa. Draining tanks typically requires a suction plate with vacuum line and quick disconnect fittings, A vacuum generator is also used for fuel evacuation. Preferably the tank sealing and evacuation unit is fitted with retractable fuel and vacuum hose reelers for compact and secure hose storage. The reelers are capable of heavy duty use and to provide protection for the hoses while not in use. The reelers house the vacuum hoses for the fuel and adaptor plates and an air inlet hose. The air inlet reeler has spring loaded return for ease of use, but for safety reasons the fuel reelers are a manual return reeler with a manual lockout screw.

Personnel is kitted with air supply and breathing apparatus for tank entry. Once inside, the tank is repaired and resealed ready for refuelling. Since the trailer has enabled this process to be carried out in a remote location a damaged plane can be returned to service much more quickly than previously since all equipment is ready and self contained. The present invention allows for a faster turnaround time for the repair of damaged tanks as it takes less time to ventilate the tanks and it provides a higher level of safety because it vents the fuel vapours away from the aircraft. All of the equipment preferably comes in a waterproof container so technicians can easily move equipment from aircraft to aircraft, with speedy set up, which makes it ideal for commercial and military aircraft. The self contained assembly runs off compressed air so it can be used virtually anywhere. This feature eliminates problems with different electrical power voltages in different countries.

The system includes pneumatically driven air movers, static bonding cable assembly, compressed air hose assembly, air filter adapter and statically conductive ducting with quick disconnect ends. The durable ventilator has no moving parts so it can be used indefinitely.

The present invention may also be employed in the repair of damaged mine dumper trucks or any land, sea or air vehicle which uses confined space tanks.

The trailer carriage may further comprise any one or more of the following optional features (not shown): a self-propelled remotely steerable tracks; self jacking mechanism for changing tyres and/or batteries in the field, battery power using rechargeable batteries that are recharged by solar panels and/or mains and/or generations; self-levelling mechanism; conveyor mechanism for loading/unloading operations; leads for charging batteries in remote locations; modules for holding and transporting gas cylinders; deployed satellite and other antennae; primary computer start-up; air filtration monitoring; communications; or air conditioning. Other features of equipment which may also be included are compressor, refrigerator, energy Management Unit; or water filtration unit.

Examples of use of the assembly herein described include air quality control for portal tank entry points on the C130 Hercules aircraft wing. This provided a safe & cool environment during confined space entry. It can be used to speed up the venting process to remove fuel vapour in wing cavities or can be used for curing sealing product & for corrosion control. By providing the right environment for tank entry work, this increases efficiency and productivity and reduces costs. The assembly further includes equipment to enable rapid drying of Air wave Guide and Avionics Systems, radar systems on craft such as ships, to maintain dry air in the internal cavity space of double hull ships preventing rust in order to prevent moisture contamination. This drying system can achieve dryness less than 1 ppm moisture content which is an extremely dry environment and as a result can prolong the life of equipment. The Air Compressor Systems manufacture medical grade air for operators conducting confined space entry on site producing and supplying continuous high air quality.

The present invention obviates the disadvantages of the prior art and provides other advantages which are apparent from the description herein. Thus mobile trailer is defined according to the particular application or applications and activities to be carried out.

It will be recognised by persons skilled in the art that numerous variations and modifications may be made to the invention described herein without departing from the overall spirit and scope of the invention.

I claim:

1. A self contained mobile trailer assembly for facilitating repair and maintenance of a punctured aircraft fuel tanks; the trailer comprising:
   an undercarriage which supports a housing having walls defining an internal space; wherein the internal space receives and retains therein technical equipment for use in and to facilitate field repair of the punctured fuel tank; the undercarriage comprising a chassis mounted on a wheel assembly, the trailer assembly being configurable between a non-working state suitable for transportation in which the housing is closed and a deployed working state in which the housing is opened for access to the technical equipment wherein the technical equipment includes desealing and decontamination equipment of treating the punctured tanks, gas monitors to enable monitoring of gas inside the tanks and gas masks.

2. A self contained mobile trailer assembly according to claim 1 wherein, the housing further comprises access panels which are extendible to allow access to the equipment.

3. A self contained mobile trailer assembly according to claim 1, wherein the technical equipment further comprises a communications kit.

4. A self contained mobile trailer assembly according to claim 1, wherein further comprising a roof rack.

5. A self contained mobile trailer assembly according to claim 1, wherein the technical equipment further comprises illumination.

6. A self contained mobile trailer assembly according to claim 1, wherein the technical equipment further comprises an access ladder.

7. A self contained mobile trailer assembly according to claim 1, wherein the technical equipment further comprises a compressor.

8. A self contained mobile trailer assembly according to claim 1, wherein the technical equipment further comprises an air receiver.

9. A self contained mobile trailer assembly according to claim 1, further comprising fork lift sleeves.

10. A self contained mobile trailer assembly according to claim 1, wherein the technical equipment further comprises an air feed supply.

11. A self contained mobile trailer assembly according to claim 1, wherein the technical equipment further comprises a portable air cooler.

12. A self contained mobile trailer assembly according to claim 1, wherein the technical equipment further comprises a generator.

13. A self contained mobile trailer assembly according to claim 1, wherein the technical equipment further comprises, an energy management unit.

14. A self contained mobile trailer assembly according to claim 1, wherein the technical equipment further comprises, a water filtration unit.

15. A method for maintenance or repairing unwanted penetrations in a wall of a confined space aircraft fuel tank of the type whose inside confined space is accessible to a person for the repair from inside the tank, the method comprising the steps of;
   a) deployment of a mobile self contained assembly for the repair of the damaged fuel tank on the aircraft; the assembly comprising an undercarriage having a wheel base, a housing mounted on the wheel base and defining an internal space capable of receiving and retaining repair and maintenance equipment;
   b) emptying a confined space tank to be repaired of any liquid stored therein;
   c) evacuating contaminated air, fumes or vapours from the tank;
   d) taking a de fouling kit from the assembly and spraying de fouling reagent on an inner surface of the tank to be de fouled;

e) de sealing the tank using a de sealing and resealing kit capable of de sealing;
f) manually repairing unwanted penetration/s in the tank; and
g) resealing the interior surface of the confined space tank.

* * * * *